_United States Patent_ [15] 3,700,249
Allam [45] Oct. 24, 1972

[54] CHUCK

[72] Inventor: James N. Allam, Woonsocket, R.I.

[73] Assignee: Leesona Corporation, Warwick, R.I.

[22] Filed: Jan. 29, 1971

[21] Appl. No.: 111,036

[52] U.S. Cl. ..............................279/2, 82/44, 242/73
[51] Int. Cl. ..............................................B23b 31/42
[58] Field of Search .............242/72, 72.1, 73; 279/2; 82/44

[56] References Cited

UNITED STATES PATENTS

| | | | |
|---|---|---|---|
| 3,526,369 | 9/1970 | Beckwith, Jr. | 279/2 X |
| 3,462,162 | 8/1969 | Stoeffler | 279/2 |
| 3,383,723 | 5/1968 | Connelly | 279/2 X |
| 2,698,551 | 1/1955 | Olsen | 279/2 X |
| 3,086,783 | 4/1963 | Kelso | 279/2 |
| 3,212,374 | 10/1965 | Anthony | 279/2 X |

*Primary Examiner*—Andrew R. Juhasz
*Assistant Examiner*—James F. Coan
*Attorney*—Albert P. Davis and Burnett W. Norton

[57] ABSTRACT

A take-up spindle carries axially spaced chucks each having a body carrying a plurality of chuck members for gripping the inner face of a hollow take-up core. Each chuck has a plurality of concentric springs which urge an actuator into a gripping position to cam the chuck members into gripping engagement with the core. Release mechanism concurrently urges the actuators of all the chucks to a released position whereupon the chuck members of each chuck are urged to a retracted position by an annular spring received in notches in generally radial faces of the respective chuck members. The chuck members are small and light weight to effectively eliminate resultant centrifugal force deforming the core, and are mounted to maintain a normal gripping force on the core although the core may tend to move axially of the spindle and chucks.

7 Claims, 4 Drawing Figures

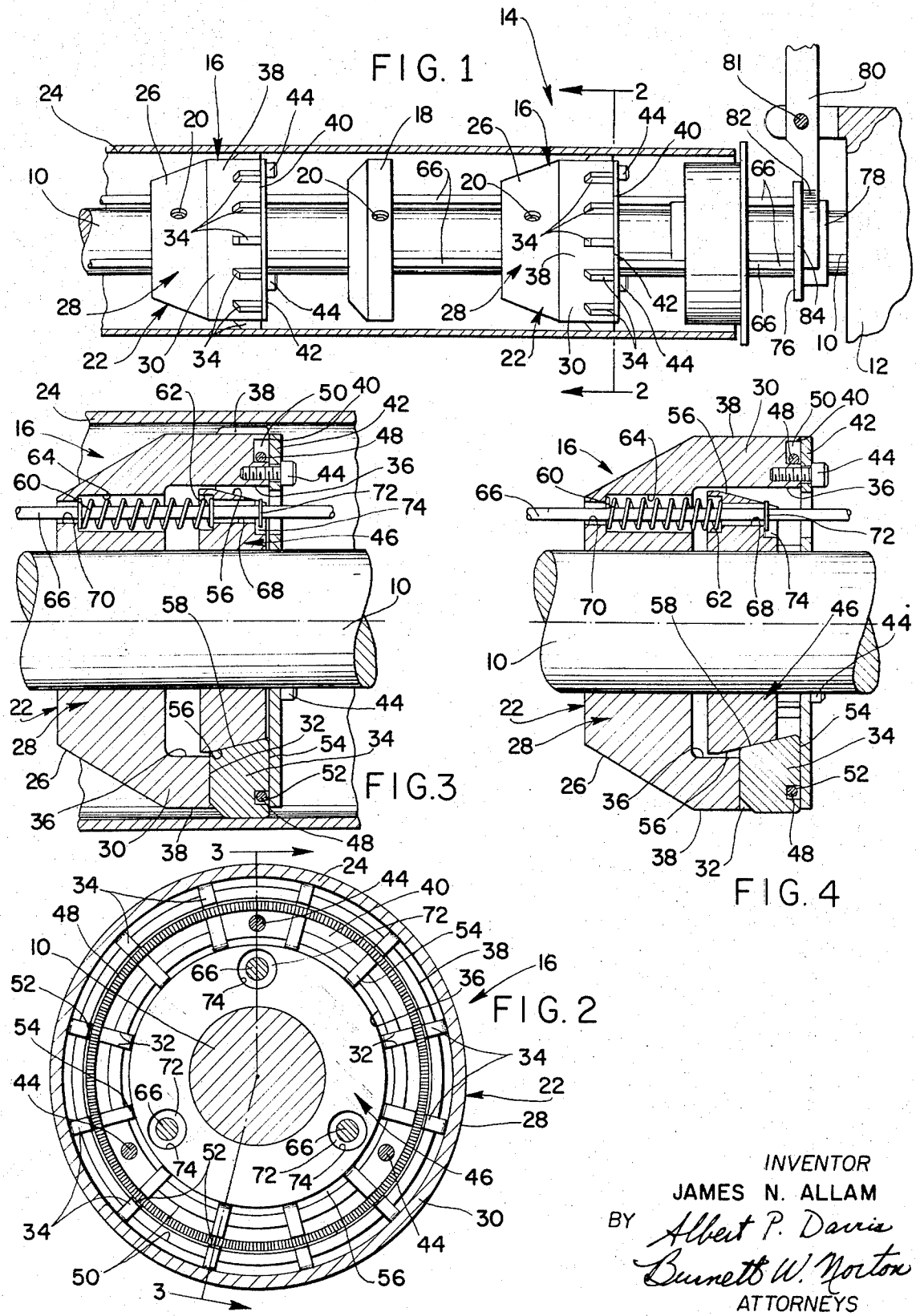

CHUCK

This invention relates to winding and, more particularly, to a chuck for releasably retaining a hollow core.

As winding or take-up speeds are increased, various problems are likely to develop in core holding chucks. One of these problems is the effect of centrifugal force of the chuck members causing a substantial increase in the gripping force applied by the chuck members to the core. Such increase in the gripping force may cause undesirable deformation of the core. Another difficulty is that axial movement of the gripped core may result in varying the gripping force applied by the chuck members to the core because of a camming inter-action between the chuck members and their actuator.

The invention is, in brief, directed to a winder or take-up chuck having a body rotatable about an axis and a plurality of chuck members mounted on the body for movement into and out of gripping engagement with a core. An axially movable actuator is yieldably urged to cam the chuck members into gripping engagement with the core and to maintain the chuck members each exerting substantially equal gripping forces on the core. The chuck members are held against axial movement relative to the body so that any tendency of the core to move axially does not effect the gripping force of the chuck members. When the actuator is in its released position the chuck members are yieldably urged to a core releasing position by an annular resilient member received in notches opening, within the body, through radial faces of the chuck members.

It is a primary object of this invention to provide a new and improved winding apparatus.

Another object is provision of a new and improved core receiving chuck including a body rotatable about an axis and carrying a plurality of chuck members for releasably gripping the core, with an axially movable actuator and cooperating cam means on the chuck members and the actuator for moving the chuck members between a released position and a core gripping position and releasably retaining the chuck members in their gripping position responsive to movement of the actuator from a released position to a gripping position, the actuator and chuck members being yieldably maintained in the gripping position and the chuck members being yieldably urged toward their released position, and the chuck members being effectively axially stationary relative to the body so that the chuck members exert their normal gripping force on the core although the core may tend to move axially of the body. Related objects include: each of the chuck members being of sufficiently light weight to effectively eliminate centrifugal force materially deforming the core; a plurality of generally axially extending compression springs positioned so that the actuator remains axially aligned and the chuck members in their gripping position exert substantially equal forces on the core; and an annular tension spring received in notches in radially extending surfaces of the chuck members for urging the chuck members toward their released position.

These and other objects and advantages of the invention will be apparent from the following description and the accompanying drawing, in which:

FIG. 1 is a fragmentary, schematic elevational view of a take-up spindle including a preferred embodiment of chucks gripping a core;

FIG. 2 is an enlarged vertical sectional view of one of the chucks taken generally along the line 2—2 in FIG. 1;

FIG. 3 is a broken sectional view taken generally along the line 3—3 in FIG. 2; and FIG. 4 is a sectional view, similar to FIG. 3, but with the chuck released from gripping engagement with the core, and the core removed.

Referring to FIG. 1 of the drawing, a spindle shaft 10 is mounted in any suitable manner on a base 12 of a winder 14, such as a take-up machine, for rotation about a longitudinal axis. A pair of axially spaced chucks 16, and therebetween a core guide 18, are fixedly mounted on the spindle shaft 10 by set bolts 20. Each chuck 16 has a body 22 which threadedly receives the set bolt 20.

With particular reference to FIGS. 2 and 3, in order to facilitate insertion of a hollow core 24 onto a chuck 16, an outer face 26 of a main portion 28 of the chuck body 22 is frusto-conical and joins a rearward annular portion 30. This annular portion 30 has a plurality of equally circumferentially spaced and radially extending slots 32 (as illustrated 12), each slot 32 receiving one of a plurality of substantially identical chuck members 34 of substantially the same axial length as the slots 32. The slots 32 are of such an axial dimension that the chuck members 34 are slidable radial therein and are held against axial movement relative to the spindle shaft 10, thus eliminating any tendency for the chuck members to move axially should the core 24 tend to move axially on the chuck members. The slots 32 open through an inner cylindrical face 36 and an outer cylindrical face 38 of the annular portion 30, and also through an annular radially disposed end face 40 of the main portion 28 of the body. An annular plate 42 (FIGS. 1-3) is received on the spindle shaft 10 and is seated on the annular face 40, and secured by bolts 44 to the main part 28 of the body 22, to retain the chuck members 34 against axial movement in the slots 32.

The chuck members 34 are made as light in weight as possible so that centrifugal force does not cause the chuck members to deform the core 24 as the rotational speed of the spindle is increased. To this end, each chuck member is preferably aluminum or a strong, light plastic, such as glass filled ZYTEL, and is thin and extends but a small portion of the core engaging length of the spindle (the distance between the chuck members of the two chucks.) Also, the radial length of each chuck member 34 is but a small portion of the total radial length from the axis of the spindle shaft 10 to the core 24.

With reference to FIGS. 2-4, for yieldably urging the chuck members 34 inwardly and against an actuator 46, a resilient member, here in the form of an annular tension spring 48, is received in an annular channel 50 in the end face 40 of the body, and in notches 52, one in each of the chuck members 34. These notches each open through a radial surface 54 of the respective chuck member and are within the body 22 and face the inner face of the plate 42 which also retains the spring 48 in place. Thus, the spring 48 is securely held in place and is protected from damage and lint.

The actuator 46 is in the form of a generally annular member snuggly slidably received on the spindle shaft 10 and has a generally frusto-conical cam surface 56.

This surface 56 engages and cooperates with beveled cam surfaces 58 (FIGS. 3 and 4) on the chuck members 34 for urging the chuck members outwardly, against the resilient force of the annular spring 48, from a retracted, released position (FIG. 4), to an extended, gripping position (FIGS. 1—3) in engagement with an inner surface of the core 24, when the actuator 46 is moved from a released position (FIG. 4) to a gripping position (FIGS. 2 and 3).

With reference to FIGS. 3 and 4, a plurality of equal strength compression springs 60 yieldably and resiliently urge the actuator 46 to its gripping position. These springs each have ends seated in sockets 62 in the actuator and opposite ends seated in sockets 64 in the main portion 28, and are equally radially and circumferentially spaced about the axis of the spindle shaft 10, and extend generally axially of the shaft. Thus, the chuck members and the actuator are always urged into engagement with each other, and the actuator does not cant relative to the spindle axis or bind, so that the chuck members each engage the core with equal gripping force.

In order to move the actuator 46 from its gripping position (FIGS. 2 and 3) to its released position (FIG. 4), a plurality of axially disposed rods 66 extend through the compression springs 60 and actuator bores 68 and body bores 70. These rods carry fixed abutment rings 72 seated in grooves in the rods 66 and disposed in sockets 74 in a face of the actuator opposite the compression spring receiving sockets 62. With reference to FIG. 1, inner ends of the rods 66 abut the annular face 76 of a sleeve 78 which is telescoped on the spindle shaft 10 and is suitably held in position for limited telescopic movement axially of the shaft 10. A lever 80 is pivoted, by a pin 81, to the base 12 of the winder and carries a yoke member 82 having opposed legs for engaging a flange 84 on the sleeve 78 so that upon pivotal movement of the lever 80 in a clockwise direction the rods 66 are urged in an outward direction (to the left, FIG. 1) so that the rings 72 move the actuator 46 axially to the left along the spindle shaft 10 and into its released position.

While this invention has been described with reference to a particular embodiment in a particular environment, various changes may be apparent to one skilled in the art and the invention is therefore not to be limited to such embodiment or environment except as set forth in the appended claims.

What is claimed is:

1. A core receiving chuck, comprising a body having an axis of rotation, a plurality of chuck members disposed about said axis for releasably gripping the core, an actuator mounted for movement generally axially of said body between gripping and released positions, cooperating cam means on said chuck members and said actuator for moving said chuck members between a released position and a core gripping position and releasably retaining said chuck members in their gripping position responsive to movement of said actuator from its released position to its gripping position, operating means including a plurality of resilient means spaced about said axis and seated against said body and said actuator for urging and normally yieldably maintaining said actuator in its gripping position and effectively preventing said actuator from canting relative to said axis so that the actuator urges said chuck members into gripping engagement with the core with substantially equal forces and maintains said chuck members exerting a normal gripping force on the core, means for releasably retaining said actuator in its released position, and means mounting said chuck members on said body for movement transversely of said axis between said gripping and released positions and when in their gripping position maintaining said chuck members in an effectively fixed axial position relative to said body for maintaining said chuck members exerting said normal gripping force on the core although the core may tend to move axially.

2. A chuck as set forth in claim 1 in which said operating means includes means yieldably urging said chuck members toward their released position.

3. A chuck as set forth in claim 2 in which each of said chuck members has a generally radially extending surface and a notch opening through said surface and within said body, and said yieldable urging means includes an annular member received in the notches.

4. A chuck as set forth in claim 1 in which each of said chuck members extends axially only a small portion of the total overall axial core engaging length of the chuck and each extends radially only a small portion of the overall radius from said axis to the core in the gripping position, so that each chuck member is of sufficiently light weight for effectively eliminating centrifugal force materially deforming the core upon rotation of the body.

5. A chuck as set forth in claim 1 in which said plurality of resilient means are individually disposed and seated within sockets in said actuator and the main portion of said body.

6. A chuck as set forth in claim 1 in which said body has a generally annular portion, the mounting means includes means defining a plurality of slots, one receiving each of said chuck members, for radial movement therein and for holding the chuck members against axial movement, said slots being in said annular portion and each extending generally radially of said axis and opening through inner and outer faces of said annular portion, said chuck members each having a generally radially extending surface and a notch opening through said surface within said body, said resilient means includes at least three generally axially extending, substantially equal strength compression springs generally concentric with and substantially equally radially and circumferentially spaced about said axis, and a resilient annular tension spring received in said notches for urging said chuck members toward their released position.

7. A chuck as set forth in claim 6 in which said chuck members are a light weight material and extend axially only a small portion of the total overall axial core engaging length of the chuck and each extend radially only a small portion of the overall radius from said axis to the core in their gripping position, so that each chuck member is of sufficiently light weight for effectively eliminating centrifugal force materially deforming the core upon rotation of the body.

* * * * *